(12) United States Patent
Willis et al.

(10) Patent No.: US 9,277,158 B2
(45) Date of Patent: Mar. 1, 2016

(54) DISPLAY ARRANGEMENT CHANGE

(71) Applicant: Hewlett-Packard Development Company, L.P., Houston, TX (US)

(72) Inventors: Christopher Willis, Palo Alto, CA (US); Kevin Smathers, Palo Alto, CA (US); Henry Sang, Jr., Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/914,458

(22) Filed: Jun. 10, 2013

(65) Prior Publication Data

US 2014/0362299 A1 Dec. 11, 2014

(51) Int. Cl.
| | |
|---|---|
| H04N 5/44 | (2011.01) |
| H04N 21/41 | (2011.01) |
| H04N 21/422 | (2011.01) |
| H04N 21/4363 | (2011.01) |
| H04N 21/462 | (2011.01) |
| H04N 21/485 | (2011.01) |

(52) U.S. Cl.
CPC ......... *H04N 5/4403* (2013.01); *H04N 21/4122* (2013.01); *H04N 21/42207* (2013.01); *H04N 21/4363* (2013.01); *H04N 21/4622* (2013.01); *H04N 21/4858* (2013.01); *H04N 21/4222* (2013.01); *H04N 21/42224* (2013.01)

(58) Field of Classification Search
CPC .................................................... H04N 5/4403
USPC ........................................................ 348/734
See application file for complete search history.

(56) References Cited

U.S. PATENT DOCUMENTS

| | | |
|---|---|---|
| 5,767,897 A | 6/1998 | Howell |
| 6,396,523 B1 | 5/2002 | Segal et al. |
| 7,242,389 B1 | 7/2007 | Stern |
| 7,580,038 B2 | 8/2009 | Chik et al. |
| 7,620,906 B2 | 11/2009 | Igeta |
| 7,688,327 B2 | 3/2010 | Robotham et al. |
| 8,166,384 B1 | 4/2012 | Kaplan et al. |
| 2004/0032400 A1 | 2/2004 | Freeman |
| 2008/0313545 A1 | 12/2008 | Patel et al. |
| 2009/0235177 A1* | 9/2009 | Saul et al. ..................... 715/740 |
| 2010/0011135 A1 | 1/2010 | Jawa et al. |
| 2010/0257457 A1 | 10/2010 | De Goes |
| 2011/0074824 A1 | 3/2011 | Srinivasan et al. |
| 2011/0102299 A1 | 5/2011 | Hochmuth et al. |
| 2011/0138314 A1 | 6/2011 | Mir et al. |
| 2011/0239114 A1 | 9/2011 | Falkenburg et al. |
| 2011/0316817 A1 | 12/2011 | Yamada et al. |

(Continued)

OTHER PUBLICATIONS

S. Doeweling, "Drop-and-drag: Easier Drag&drop on Large Touchscreen Displays," Oct. 16-20, 2010, http://dl.acm.org/citation.cfm?id=1868936> pp. 158-167.
B. Bowman, "Preview and Inspect Web Designs on Devices with Adobe Edge Inspect," Dec. 2012, http://www.adobe.com/inspire/2012/12web-designs-edge-inspect.html.
B. Johanson, "Multibrowsing: Moving Web Content Across Multiple Displays," Sep. 30-Oct. 2, 2001, http://graphics.standford.edu/papers/mb_ubicomp01/mb_cam2.pdf.

(Continued)

*Primary Examiner* — Jefferey Harold
*Assistant Examiner* — Justin Sanders
(74) *Attorney, Agent, or Firm* — Law Office of Michael Dryla (57) ABSTRACT

A remote control device sends an arrangement change to a display device. The display device responsively changes an arrangement of video feeds displayed thereon. The display device transmits the arrangement to every remote control device. The arrangement change transmitted to the display device and the arrangement transmitted by the display device do not include any of the video feeds.

15 Claims, 3 Drawing Sheets

(56) References Cited

U.S. PATENT DOCUMENTS

| | | |
|---|---|---|
| 2012/0139945 A1 | 6/2012 | Choi |
| 2012/0185770 A1 | 7/2012 | Hwang et al. |
| 2012/0242574 A1 | 9/2012 | Munehiro et al. |
| 2013/0021373 A1 | 1/2013 | Vaught et al. |
| 2013/0024418 A1* | 1/2013 | Sitrick et al. ......... 707/608 |
| 2013/0024795 A1 | 1/2013 | Robotham et al. |
| 2013/0061155 A1 | 3/2013 | Hon |

OTHER PUBLICATIONS

Picasa Geeks, "Sort Photos is Please Web Albums", Jun. 29, 2010, retrieved from http://picasageeks.com/2010/06/sort-photosin-picasa-web-albums on May 14, 2015.

US Office Action issued in U.S. Appl. No. 13/913,791 dated May 22, 2015; 13 pages.

* cited by examiner

DISPLAY ARRANGEMENT CHANGE

BACKGROUND

Large-scale displays, commonly referred to as or which include video walls, can be on the order of several feet and typically more in diagonal size. Such displays are commonly used in environments in which many people need to view information at the same time, such as in control rooms or operation centers. A number of large-scale displays may be deployed within such an environment.

DETAILED DESCRIPTION

As noted in the background, video walls and other types of large-scale displays are used in environments like control rooms and operation centers to permit groups of people to easily view information. Different such display devices may display different information from the same or different sources, and a given display device may also display different information. Depending on the situation, different information may be displayed on the same or different display devices at different types as well.

Disclosed herein are techniques for changing the arrangement of information displayed on a display device using a remote control device, which can be a general-purpose computing device like a desktop or laptop computer, a smartphone, a tablet device, and so on. Feeds from video sources, which can also be referred to as display objects from object sources or display items from display sources, are received by every remote control device and every display device. An arrangement change, which can also be referred to as a command or an instruction, is transmitted from a given remote control device to a given display device. The arrangement change can specify how and/or which feeds from the video sources are to be displayed on the given display device. In response to receiving the instruction, the given display device correspondingly changes its arrangement, which can be also be referred to as a layout or a configuration, of the video feeds as displayed by the given display device. The given display device sends its current arrangement after making this change to every remote control device.

These techniques can provide for certain technological advantages. First, the amount of information transmitted among the display devices and the remote control devices is minimal, because it does not include any of the video feeds themselves. That is, the video feeds are sent separately to each display device and to each remote control device. When a remote control device transmits an arrangement change to a display device, the arrangement change identifies one or more video feeds but does not actually include these video feeds. Likewise, when a display device transmits its current arrangement to each remote control device, the arrangement identifies the video feeds but does not actually include the feeds. This permits computing devices with relatively low processing and/or graphics power, such as some types of smartphones, to nevertheless be employed as remote control devices, for instance.

Second, the techniques disclosed herein permit one-to-one, one-to-many, many-to-one, and many-to-many relationships between the display devices and the remote control devices. A given remote control device can control multiple display devices, and may be able to effectuate an arrangement change over two or more such display devices by, for instance, causing a video feed that is currently being displayed by one display device to be "moved" so that it is instead displayed by another display device. A given display device can be controlled by multiple remote control devices. Because each display device transmits its current arrangement to every remote control device after making an arrangement change—and not just to the remote control device that caused this change—each remote control device remains up-to-date as to the current arrangement of each display device. Combining the one-to-many and many-to-one scenarios thus permits a many-to-many scenario to be achieved as well.

Figure 1:
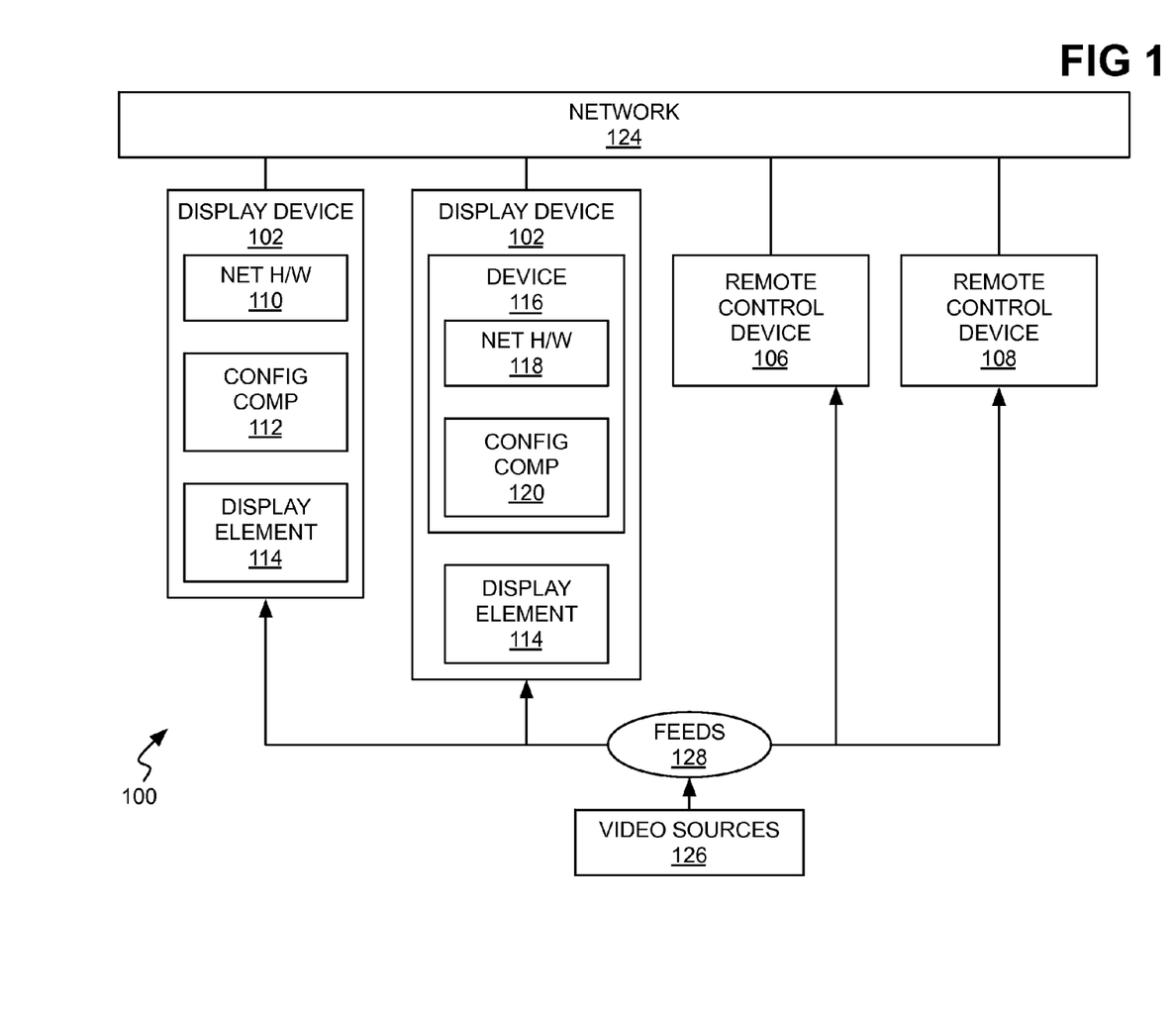
FIG. 1 is a diagram of an example system including display devices and remote control devices.

FIG. 1 shows an example system 100. The system 100 is depicted as including two display devices 102 and 104, but can include as few as one display device as well as more than two display devices. The system 100 is similarly depicted as including two remote control devices 106 and 108, but can include as few as one remote control device as well as more than two remote control devices. The techniques disclosed herein are described in example terms with respect to the two display devices 102 and the two remote control devices 106 and 108, however. The display devices 102 and 104 and the remote control devices 106 and 108 are communicatively interconnected via a network 124. The network 124 can be or include a wired or a wireless network, such as a local-area network (LAN), a wide-area network (WAN), a telecommunications network, the Internet, an intranet, an extranet, and so on.

The display devices 102 and 104 and the remote control devices 106 and 108 each separately receive feeds 128 from video sources 126. The video sources 126 may provide the feeds 128 to the display devices 102 and 104 and the remote control devices 106 and 108 using the same network 124 over which the display devices 102 and 104 communicate with the remote control devices 106 and 108, over a different network, or in a different manner. The video sources 126 can include analog as well as digital sources. The feeds 128 can include stationary images, moving images (i.e., "video"), and/or audio. Examples of feeds 128 include static and dynamic web pages hosted on web sites, stationary and/or moving images with or without sound from digital and analog video cameras, and so on.

Two different types of display devices 102 and 104 are depicted in the example of FIG. 1. The display device 102 includes network hardware 110, a hardware-implemented configuration component 112, and a display element 114 that are integrated with one another. For instance, the display device 102 may be a display device that has an integrated display (i.e., the display element 114) and that provides for functionality in accordance with the techniques disclosed herein. The display device 104 by comparison includes a device 116 having network hardware 118 and a hardware-implemented configuration component 120 that is separate from the display element 122. For instance, the device 116 can provide for functionality in accordance with the techniques disclosed herein in relation to an external display (i.e., the display element 122) that may not otherwise have this functionality.

The network hardware 110 and 116 communicatively interconnect the display devices 102 and 104 to the remote control devices 106 and 108 over the network 124 as well as to the video sources 126. The configuration components 112 and 120 provide for the functionality according to techniques that are disclosed herein, as described above and as described further below. The configuration components 112 and 120 are implemented in hardware in one of at least two different ways. First, the configuration components 112 and 120 may include non-transitory computer-readable storage media and processors, where the processors execute computer code stored on the media. Second, the configuration components 112 and 120 may be implemented in special-purpose hardware apart from general-purpose processors.

The display elements 114 and 122 can each include one or more types of displays, like liquid crystal displays (LCDs), light-emitting diode (LED) displays, plasma displays, projection displays, and so on. For example, a display element may include a number of such displays that are organized in a grid or other fashion to form the display element in question, or may include just one such display. The configuration components 112 and 120 control which feeds 128 from the video sources 126 are displayed on the display elements 114 and 122, respectively, and how the feeds 128 are displayed on the display elements 114 and 122, responsive to instructions or commands received from the remote control devices 106 and 108.

The remote control devices 106 and 108, as noted above, can each be or include a computing device, like a desktop or laptop computer, a smartphone, a tablet device, and so on. The remote control devices 106 and 108 thus do not have to be special-purpose devices, but can be more general-purpose computing devices that run computer code in the form of application programs, "apps," and so on, to achieve the functionality according to the techniques disclosed herein, as described above and as described further below. For example, such computer code can be stored on non-transitory computer-readable media and executed by processors of the remote control devices 106 and 108 to realize this functionality. In general, the remote control devices 106 and 108 transmit arrangement changes of the feeds 128 to the display devices 102 and 104 over the network 124, and receive the current arrangements displayed on the display devices 102 and 104 therefrom over the network 124.

For example, if there are nine video feeds 128 currently being displayed in a three-by-three grid by the display device 102, an arrangement change can specify the order in which the feeds 128 are displayed, as well as switching a currently undisplayed video feed 128 for one of the nine video feeds 128. An arrangement change can specify how the video feeds 128 are to be displayed as well. Instead of being displayed in a three-by-three grid, for instance, the video feeds 128 may be specified within an arrangement change to be displayed such that one video feed 128 takes up the top half of the display, and the other video feeds 128 are displayed in a smaller manner below, besides, or around this video feed 128. An arrangement change can specify for a particular video feed 128 being displayed, that a portion thereof should be zoomed in on, panned in a particular direction, zoomed out of, and so on. An arrangement change can move one video feed 128 being displayed on one display device 102 or 104 to the other display device 102 or 104. Other types of arrangement changes are also amenable to usage in accordance with the techniques described herein.

As additional examples, an arrangement change may instruct a display device 102 or 104 to substitute one video feed 128 for another video feed 128. An arrangement change may instruct a display device 102 or 104 to add a new video feed 128 alongside an already displayed video feed 128. An arrangement change may instruct a display device 102 or 104 to display a particular set of the video feeds 128 in a specified configuration from a menu of such configurations that were previously determined. An arrangement change may instruct a display device 102 or 104 to combine two or more previously determined configurations, replacing one such configuration with another, placing two or more such configurations side by side, and so on.

The manner by which each remote control device 106 and 108 receives arrangement changes thereon for transmission to a display device 102 or 104 can likewise vary. On a remote control device 106 or 108 having a touchscreen, a user may manipulate windows or other graphical user interface (GUI) elements that show the video feeds 128 themselves or representations thereof. The resulting arrangement change may then be transmitted to the display device 102 or 104 in question immediately, or when the user is satisfied with the arrangement change and indicates that it should be transmitted. For a remote control device 106 or 108 that does not have a touchscreen, a mouse or other pointing device may be employed to manipulate the GUI elements that show the video feeds 128 or representations thereof.

The current arrangement of the video feeds 128 on a display device 102 or 104 in question is transmitted each time it is changed, and may be transmitted in one implementation in three parts. The first part, which is sent immediately to each remote control device 106 and 108, identifies the display device 102 or 104 sending the update, and specifies the new location and/or new size of each feed 128 being displayed. The second part can include a snapshot of the feed contents, which is not directly sent to the remote control devices 106 and 108, but rather may be saved to a file share location whether the devices 106 and 108 can access them as desired or as needed. Examples of such a file share location include those provided by various types of operating systems, and web servers that support PUT and GET operations to configurable namespaces. The third part is sent after the second part has been transmitted to the file share location. The third part is sent to the remote control devices 106 and 108, and notifies the devices 106 and 108 that the snapshot of the second part is now available at the file share location in question.

Where a remote control device 106 or 108 has relatively low processing and/or graphics power, or has limited communication bandwidth, it may not display the video feeds 128 in real-time as they are displayed on the display devices 102 and 104 themselves. Rather, representations of the video feeds 128 may be displayed thereon. For example, with respect to live video, snapshots of the live video may be periodically updated for display on the display devices 102 and 104 in lieu of the real-time video itself. In this way, a user may be able to use such a remote control device 106 or 108 to control the display devices 102 and 104 even when, for instance, the user is using the remote control device 106 or 108 in question in an area that has poor communication bandwidth.

Furthermore, as noted above, the arrangement changes sent by the remote control devices 106 and 108 and the arrangements sent by the display devices 102 and 104 do not include any of the video feeds themselves. Rather, the arrangement changes and the arrangements just identify by the video feeds, such as by a unique identifier, address, or other manner. This ensures that excessive bandwidth of the network 124 is not used to realize the techniques disclosed herein, and further ensures that remote control devices 106 and 108 having relatively low processing and/or graphics power, or limited communication bandwidth, can be employed.

Figure 2:
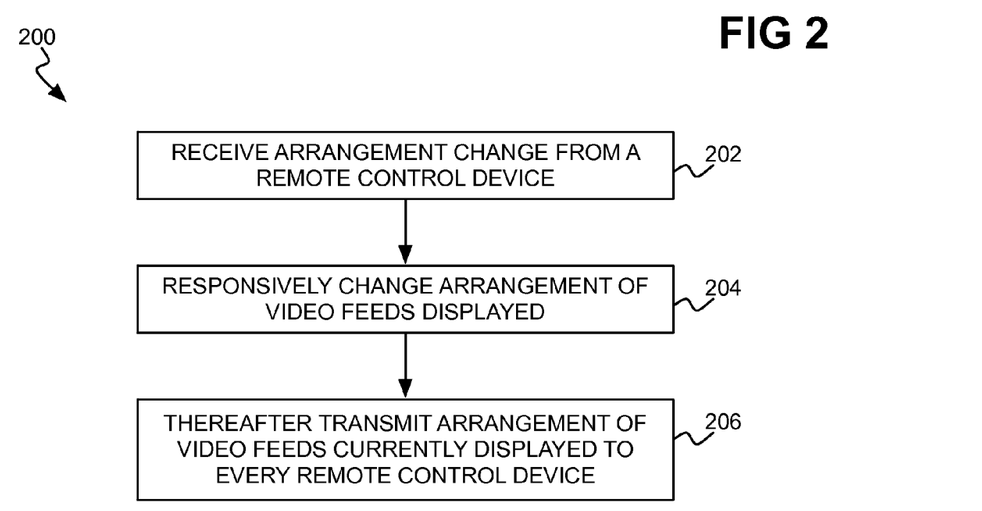
FIG. 2 is a flowchart of an example method that a display device of the system of FIG. 1 can perform.

FIG. 2 shows an example method 200 that each display device 102 and 104 of the system 100 can perform. The method 200 can be implemented as software code stored on a non-transitory computer-readable medium and executable by the display device 102 or 104 in question. The method 200 is described in example relation to the display device 102. The display device 102 receives an arrangement change from the remote control device 106 or 108 (202), which for descriptive purposes is the remote control device 106. The arrangement change specifies a change in which video feeds 128 are to be displayed by the display device 102, and how these video feeds 128 are to be displayed.

In response, the display device 102 correspondingly changes the arrangement of the video feeds 128 that it is currently displayed (204). Thereafter, the display device 102 transmits the arrangement of the video feeds 128 as currently displayed thereby to every remote control device 106 and 108 (206). That is, the arrangement of the video feeds 128 is transmitted to both remote control devices 106 and 108, even though the arrangement was changed responsive to an arrangement change received from the remote control device 106 in particular.

Figure 3:
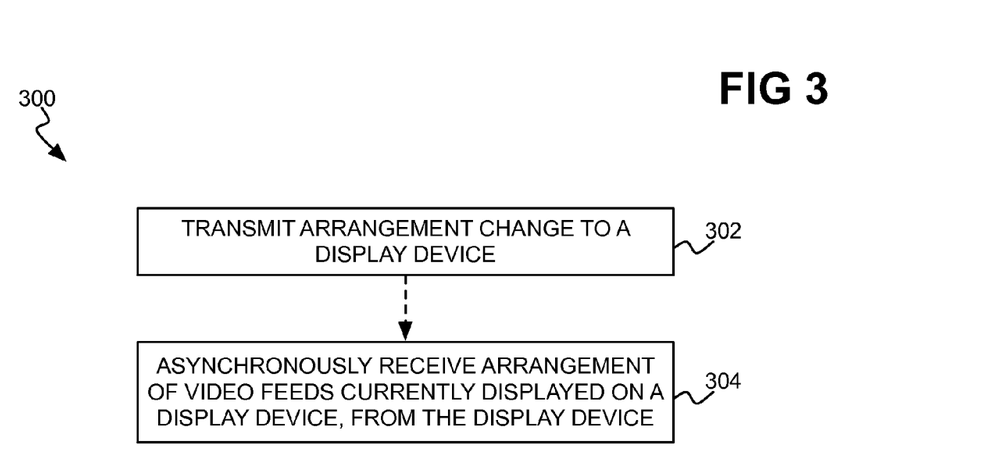
FIG. 3 is a flowchart of an example method that a remote control device of the system of FIG. 1 can perform.

FIG. 3 shows an example method 300 that each remote control device 106 and 108 of the system 100 can perform. The method 300 can be implemented as software code stored on a non-transitory computer-readable medium and executable by the remote control device 106 or 108 in question. The method 300 is described in example relation to the remote control device 106. The remote control device 106 transmits an arrangement change, as may have been initiated by a user of the device, for instance, to the display device 102 or 104 (302). The arrangement change specifies a change in which video feeds 128 are to be displayed by the display device 102 or 104 in question, and how these video feeds 128 are to be displayed.

The remote control device 106 further asynchronously (i.e., not necessarily responsive to part 302 being performed) receives the arrangement of the video feeds 128 as currently displayed by the display device 102 or 104 (304). For example, responsive to part 302 being performed, the remote control device 106 receives the current arrangement of the video feeds 128 on the display device 102 from this device 102, which acts as an acknowledgment that the display device 102 has received the arrangement change and has correspondingly updated its display of the video feeds 128. Such acknowledgment is particularly useful where the user controlling the remote control device 106 is not in the same room as the display device 102, or otherwise cannot view the display device 102, such that the acknowledgment serves as confirmation of the display device 102 having properly processed the arrangement change sent in part 302. It is noted that the remote control device 106 may receive arrangement changes from every display device 102 and 104, even if the device 106 does not control a particular display device in question, in which case the remote control device 106 ignores such updates.

As another example, the remote control device 106 receives the current arrangement of the video feeds on the display device 102 or 104 from the display device 102 or 104 in question, responsive to the other remote control device 108 having transmitted an arrangement display to this display device 102 or 104. That is, even when the other remote control device 108 causes a change in the current arrangement of the feeds 128, the remote control device 106 still receives responsive to this arrangement change the current arrangement being displayed by the display device 102 or 104 in question. This ensures that the remote control devices 106 and 108 remain in synchronization with one another as to the current arrangements of the display devices 102 and 104, permitting both remote control devices 106 and 108 to control each display device 102 and 104 at essentially the same time.

Figure 4:
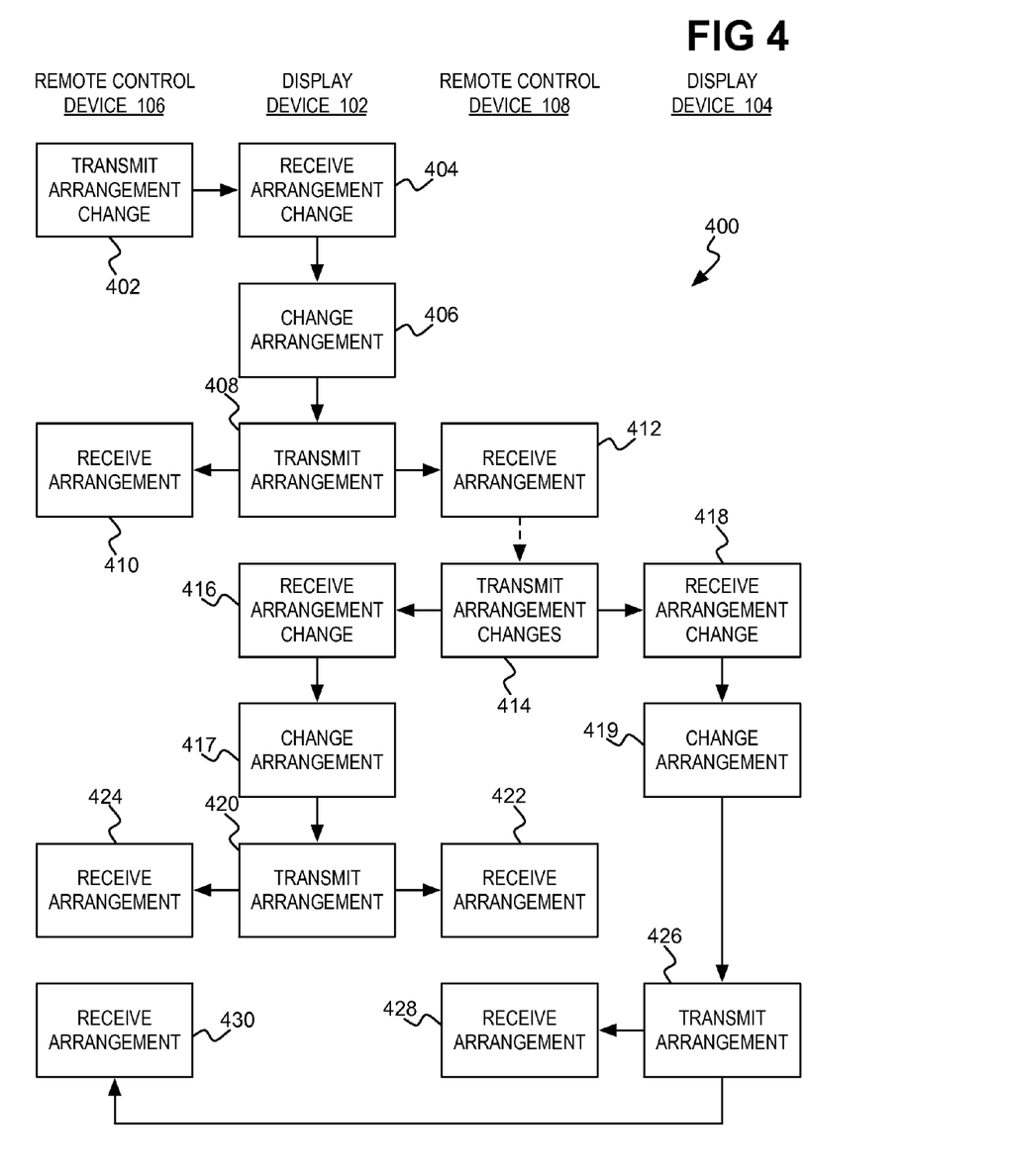
FIG. 4 is a flowchart of an example method depicting example performance of the methods of FIGS. 2 and 3.

FIG. 4 shows an example method 400 of example performance of the methods 200 and 300 in relation to the system 100. The method 400 is presented and described herein to provide a concrete example of how the system 100 can function pursuant to the methods 200 and 300 that have been described. Parts of the method 400 are divided over four columns in FIG. 4, which are respectively performed by the remote control device 106, the display device 102, the remote control device 108, and the display device 104 indicated at the top of this figure.

The remote control device 106 transmits an arrangement change to the display device 102 (402), which receives this arrangement change (404). The display device 102 responsively changes the arrangement of the video feeds 128 displayed thereon (406), and thereafter transmits its current arrangement of the video feeds 128 as displayed thereon to both remote control devices 106 and 108 (408). The remote control device 106 receives this arrangement as confirmation of the change it sent in part 402 (410), whereas the remote control device 108 receives the arrangement to ensure that it is synchronization with the remote control device 106 as to the display device 102 (412).

At some point therefore, the remote control device 108 transmits arrangement changes to both the display device 102 and the display device 104 (414). The display device 102 receives the arrangement change intended for the device 102 (416), and similarly the display device 104 receives the arrangement change intended for the device 104 (418). The display device 102 changes the arrangement of the video feeds 128 displayed thereon in accordance with the arrangement change received in part 416 (419), and then transmits its current arrangement to both remote control devices 106 and 108 (420). The remote control device 108 receives this arrangement as confirmation of the change it sent in part 414 (422), and the remote control device 106 receives this arrangement to ensure that it is in synchronization with the remote control device 108 with respect to the display device 102 (424).

Likewise, the display device 104 changes the arrangement of the video feeds 128 that it displays in accordance with the arrangement change received in part 418). The display device 104 changes the arrangement of the video feeds 128 displayed thereon in accordance with this arrangement change (421), and then transmits its current arrangement to both remote control devices 106 and 108 (426). The remote control device 108 receives this arrangement as confirmation of the change it sent in part 414 (428), whereas the remote control device 106 receives this arrangement to ensure that it is in synchronization with the remote control device 106 with respect to the display device 104 (430).

We claim:

1. A device comprising:
   networking hardware to communicate with a plurality of video sources and a plurality of remote control devices including a given remote control device, the video sources providing a plurality of feeds to a shared display device and to every remote control device; and
   a configuration component implemented at least in hardware and to:

responsive to receipt from the given remote control device of an arrangement change, correspondingly change an arrangement of the video feeds currently being displayed on the shared display device controllable by each remote control device, the arrangement including which video feeds are currently being displayed on the shared display device and in what order; and transmit the arrangement to every remote control device, including the given remote control device, after the arrangement of the video feeds has been changed and after the shared display device is currently displaying the video feeds in accordance with the arrangement change, wherein the arrangement change received from the given remote control device and the arrangement transmitted to every remote control device do not include any of the video feeds.

2. The device of claim 1, wherein the arrangement change specifies a change in one or more of which of the video feeds are to be displayed on the display and how the video feeds are to be displayed on the display.

3. The device of claim 1, wherein the arrangement change is a first arrangement change, the given remote control device is a first given remote control device, the remote control devices further include a second given remote control device, and the configuration component is further to:

responsive to receipt from the second given remote control device of a second arrangement change, correspondingly change the arrangement of the video feeds as displayed on the display; and transmit the arrangement to every remote control device after the arrangement of the video feeds has been changed resulting from the second arrangement change, wherein the second arrangement change received from the second given remote control device and the arrangement transmitted to every remote control device thereafter do not include any of the video feeds.

4. The device of claim 1, further comprising the display as part of the device.

5. The device of claim 1, wherein the display is external to and communicatively connected to the device.

6. A non-transitory computer-readable medium storing computer-executable code that a computing device executes to perform a method comprising:

transmitting a first command to a shared display device with which the computing device is communicatively connected, the first command specifying a change in a layout displayed by the shared display device of a plurality of display objects that a plurality of object sources provide to the shared display device and to a plurality of remote control devices including the computing device, the shared display device controllable by each remote control device and by the computing device, the layout including which display objects are currently being displayed on the shared display and in what order; and receiving the layout of the display objects as transmitted by the shared display device to every remote control device including the computing device after the shared display device has changed the layout responsive to a second command transmitted by any remote control device and after the shared display device is currently displaying the video feeds in accordance with the change specified by the first command, wherein the first command transmitted to the display device and the layout received from the display device do not include any of the display objects.

7. The non-transitory computer-readable medium of claim 6, wherein the change specified in the first command denotes a change in one or more of which of the display objects are to be displayed on the display device and how the display objects are to be displayed on the display device.

8. The non-transitory computer-readable medium of claim 6, wherein the method further comprises:

receiving the layout of the display objects as transmitted by the display device to every remote control device after the display device has changed the layout responsive to the first command, wherein the layout received from the display device after the display device has changed the layout responsive to the first command does not include any of the display objects.

9. The non-transitory computer-readable medium of claim 6, wherein the method further comprises:

transmitting a third command to the display device, the third command specifying a second change in the layout; and receiving the layout of the display objects as transmitted by the display device to every remote control device after the display device has changed the layout responsive to the third command, wherein the third command transmitted to the display device and the layout received from the display device thereafter do not include any of the display objects.

10. The non-transitory computer-readable medium of claim 6, wherein the display device is a first display device, and the method further comprises:

transmitting a third command to a second display device with which the computing device is communicatively connected, the third command specifying a change in a layout displayed by the second display device of the display objects that the object sources also provide to the second display device; and receiving the layout of the display objects as transmitted by the second display device to every remote control device after the second display device has changed the layout responsive to a fourth command transmitted by any remote control device, wherein the third command transmitted to the second display device and the layout received from the second display device do not include any of the display objects.

11. A system comprising:

one or more shared display devices, each shared display device to independently display a configuration of a plurality of display items provided by a plurality of display sources to each shared display device, the configuration including which display items are displayed on the display and in what order; and one or more remote control devices to each remotely control each shared display device, and to each receive the display items from the display sources, wherein a given remote control device of the one or more remote control devices is to transmit an instruction to a given shared display device of the one or more shared display devices, the instruction specifying a change in the configuration currently being displayed by the given shared display device of the display items, wherein each shared display device, responsive to changing the configuration of the display items displayed thereby, is to transmit the configuration to every remote control device after the shared display device is currently displaying the display items in accordance with the change in the configuration, and wherein the instruction transmitted by the given remote control device and the configuration transmitted by each display device do not include any of the video feeds.

12. The system of claim 11, wherein the change specified in the instruction denotes a change in one or more of which of the display items are to be displayed on the given display device and how the display items are to be displayed on the given display device.

13. The system of claim 11, wherein the one or more display devices comprise a plurality of display devices,
and wherein the given remote control device is able to change a configuration of the display items displayed by any display device.

14. The system of claim 11, wherein the one or more remote control devices comprise a plurality of remote control devices,
and wherein any remote control device is able to change the configuration of the display items displayed by the given display device.

15. The system of claim 11, wherein the one or more display devices comprise a plurality of display devices,
wherein the one or more remote control devices comprise a plurality of remote control devices,
and wherein any remote control device is able to change a configuration of the display items displayed by any display device.

* * * * *

UNITED STATES PATENT AND TRADEMARK OFFICE
CERTIFICATE OF CORRECTION

| | | |
|---|---|---|
| PATENT NO. | : 9,277,158 B2 | Page 1 of 1 |
| APPLICATION NO. | : 13/914458 | |
| DATED | : March 1, 2016 | |
| INVENTOR(S) | : Willis et al. | |

It is certified that error appears in the above-identified patent and that said Letters Patent is hereby corrected as shown below:

On the title page item (74), Name of the Attorney, in column 2, line 2, delete "Dryla" and insert -- Dryja --, therefor.

Signed and Sealed this
Twelfth Day of July, 2016

Michelle K. Lee
*Director of the United States Patent and Trademark Office*